(12) United States Patent
Mason

(10) Patent No.: US 12,293,467 B2
(45) Date of Patent: May 6, 2025

(54) SYSTEMS AND METHODS FOR SMOOTHING AND SIMPLIFYING PROXY MESHES

(71) Applicant: Electronic Arts Inc., Redwood City, CA (US)

(72) Inventor: Ashton Mason, Brighton (GB)

(73) Assignee: Electronic Arts Inc., Redwood City, CA (US)

( * ) Notice: Subject to any disclaimer, the term of this patent is extended or adjusted under 35 U.S.C. 154(b) by 254 days.

(21) Appl. No.: 18/126,527

(22) Filed: Mar. 27, 2023

(65) Prior Publication Data

US 2024/0331300 A1    Oct. 3, 2024

(51) Int. Cl.
*G06T 17/20* (2006.01)
(52) U.S. Cl.
CPC ........ *G06T 17/205* (2013.01); *G06T 2210/36* (2013.01)
(58) Field of Classification Search
CPC .................................................. G06T 17/205
See application file for complete search history.

(56) References Cited

U.S. PATENT DOCUMENTS

| | | | | |
|---|---|---|---|---|
| 2004/0051711 A1* | 3/2004 | Dimsdale | ............... | G01B 11/24 345/419 |
| 2023/0360328 A1* | 11/2023 | Gao | ....................... | G06T 15/205 |
| 2024/0296628 A1* | 9/2024 | Gao | ....................... | G06T 17/205 |

OTHER PUBLICATIONS

Garland et al. "Surface simplification using quadric error metrics," SIGGRAPH '97: Proceedings of the 24th Annual Conference on Computer Graphics and Interactive Techniques, pp. 209-216 (Aug. 1997) (available at: https://www.cs.cmu.edu/~./garland/Papers/quadrics.pdf).

Li, Minchen. "CPSC 548—Directed Studies—Report: A Vertex-Edge Quadric for Edge Collapse Mesh Simplification," *The University of British Columbia* (2017) (available at: https://www.math.ucla.edu/~minchen/doc/VEQ.pdf).

Yao et al. "Quadratic Error Metric Mesh Simplification Algorithm Based on Discrete Curvature," *Mathematical Problems in Engineering, Research Article ID 428917*, vol. 2015 (May 11, 2015) (available at: https://www.hindawi.com/journals/mpe/2015/428917/).

* cited by examiner

*Primary Examiner* — Shivang I Patel
(74) *Attorney, Agent, or Firm* — Leydig, Voit & Mayer, Ltd.

(57) ABSTRACT

A method, device, and computer-readable storage medium for generating a proxy mesh are disclosed. The method includes: receiving a reference mesh, wherein the reference mesh comprises a polygonal mesh that is a computer representation of a three-dimensional (3D) object; computing quadrics corresponding to the reference mesh; receiving a second polygonal mesh, wherein the second polygonal mesh comprises a polygonal mesh generated based on the reference mesh; transferring the quadrics corresponding to the reference mesh to the second polygonal mesh; and generating a proxy mesh based on the quadrics corresponding to the reference mesh transferred to the second polygonal mesh.

20 Claims, 16 Drawing Sheets

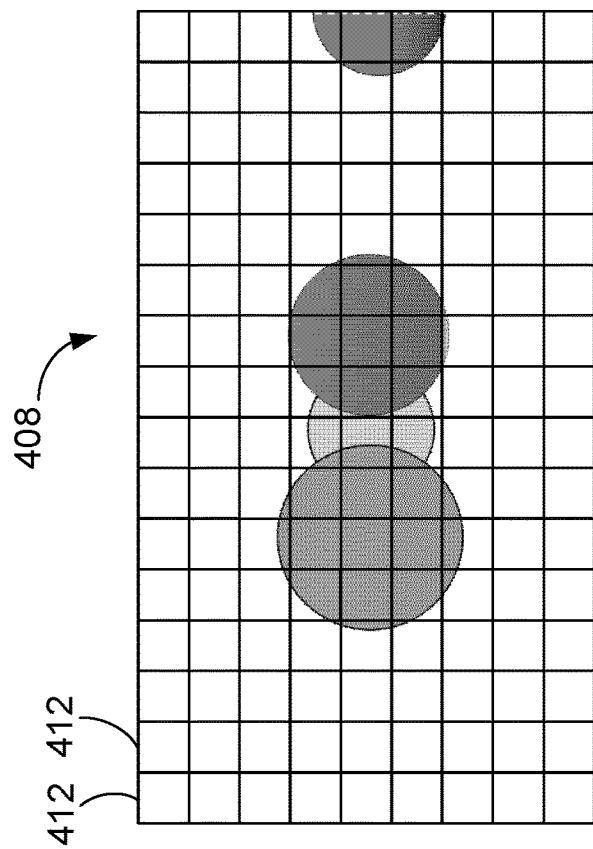
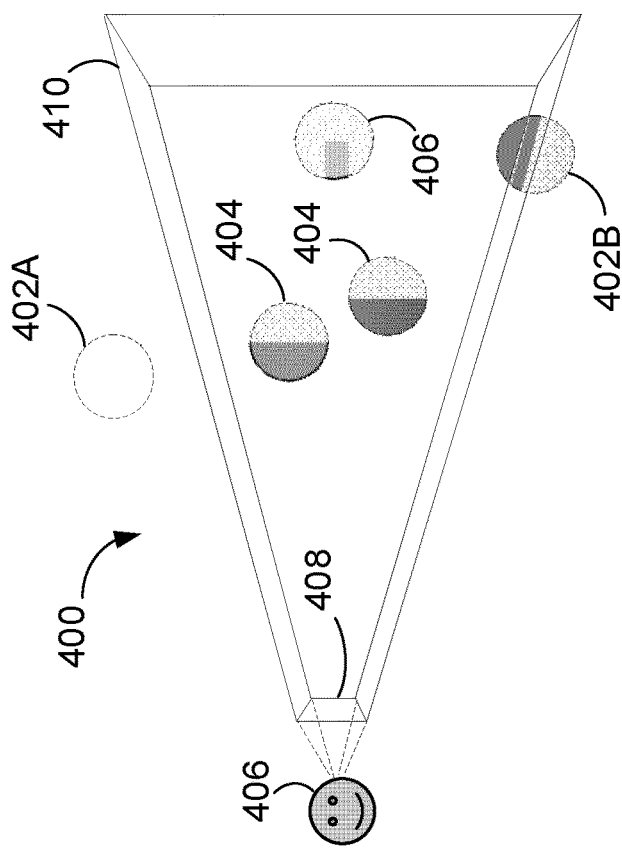
FIG. 4B
FIG. 4A

SYSTEMS AND METHODS FOR SMOOTHING AND SIMPLIFYING PROXY MESHES

FIELD

This disclosure generally relates to computer graphics and, more particularly, to systems and methods for smoothing and simplifying proxy meshes, such as voxel-based proxy meshes.

BACKGROUND

For three-dimensional (3D) graphics applications, such as video games or animated films, efficient processing of data by reducing computational complexity of a given operation is often useful. This is particularly the case in real-time applications, such as video games.

Various operations can be performed using computer-generated objects in a scene. An object may be represented as a polygonal mesh, which comprises a collection of vertices, edges, and faces that define the shape and/or boundary of the object.

One technique for reducing the computational complexity of an operation involving an artist-authored object is to perform the operation using a "proxy object." A proxy object may be a simpler object (i.e., a simpler polygonal mesh) made to look like the artist-authored object. The proxy object can be used as a stand-in for the artist-authored object for performing operations involving the artist-authored object to reduce computational complexity, such as, for example, when the artist-authored object is only visible from far away from a camera location. In some implementations, the full resolution artist-authored object may not be needed for the operation, and so there are circumstances in which a lower resolution, simplified object (i.e., the proxy object) is more appropriate to use in the operation in order to reduce the resource cost of performing the operation.

One conventional approach to generating a proxy object involves Laplacian smoothing. In Laplacian smoothing, a polygonal mesh is updated in a series of steps. In each step, each vertex of the polygonal mesh is moved to a new location that is calculated as an average of the positions of the neighbor vertices of the vertex in the polygonal mesh. The neighbor vertices are the vertices connected to a given vertex by an edge. A well-known problem of Laplacian smoothing is that it tends to "wither" the polygonal mesh, reducing its volume and making it thinner. Too much withering can make the final mesh that results from multiple passes of performing Laplacian smoothing a poor match for the original polygonal mesh, albeit very smooth, thus making the final mesh a poor choice to use as a proxy object.

Likewise, a polygonal mesh can be simplified by iteratively collapsing edges to single vertices. One problem with traditional mesh simplification when generating a proxy object is in the common situation where the input polygonal mesh is made up of several disjoined meshes. In such a case, each disjointed mesh is simplified independently, which can result in poor proxy meshes and also unnecessary triangles, since there is no information shared among the disjointed meshes during simplification. Another problem is that when traditional mesh simplification is applied to a previously smoothed mesh, the simplification can at best only preserve the shape of the smoothed mesh that is input for simplification, which can be a poor stand-in for the original polygonal mesh before smoothing.

As such, there remains a need in the art for an improved system and method for smoothing and simplifying polygonal meshes, including voxel-based proxy meshes.

SUMMARY

Embodiments of the disclosure provide a method, device, and computer-readable storage medium for generating a proxy mesh. The method includes: receiving a reference mesh, wherein the reference mesh comprises a polygonal mesh that is a computer representation of a three-dimensional (3D) object; computing quadrics corresponding to the reference mesh; receiving a second polygonal mesh, wherein the second polygonal mesh comprises a polygonal mesh generated based on the reference mesh; transferring the quadrics corresponding to the reference mesh to the second polygonal mesh; and generating a proxy mesh based on the quadrics corresponding to the reference mesh transferred to the second polygonal mesh.

BRIEF DESCRIPTION OF THE DRAWINGS

FIG. 4A is a block diagram illustrating rendering of a scene, according to one embodiment.

FIG. 4B is an example of an image of a scene, according to one embodiment.

DETAILED DESCRIPTION

Figure 1:
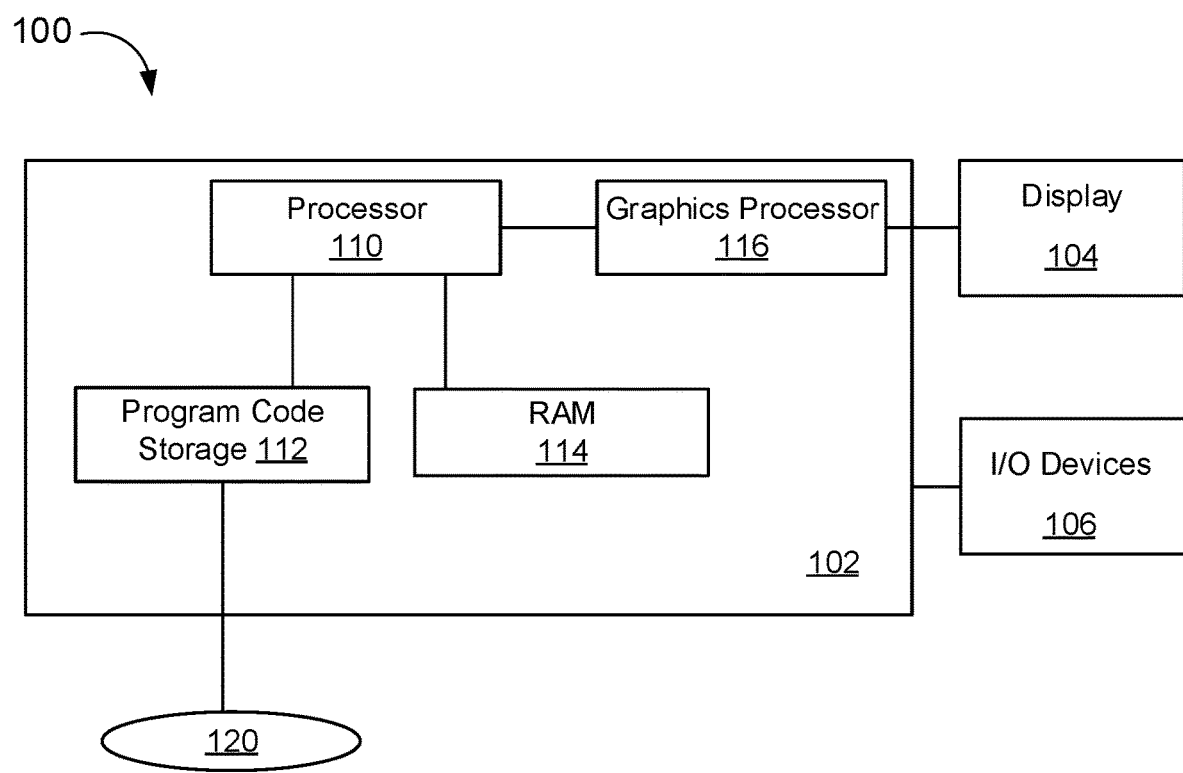
FIG. 1 is a block diagram of a computer system for rendering images, according to aspects of the present disclosure.

The following detailed description is exemplary in nature and is not intended to limit the disclosure or the application and uses of the disclosure. Furthermore, there is no intention to be bound by any expressed or implied theory presented in the preceding technical field, background, summary, brief description of the drawings, or the following detailed description.

In conventional approaches, in the context of computer-generated objects represented as polygonal meshes, a proxy mesh for an artist-authored mesh can be made using Laplacian smoothing techniques. However, as described, these proxy meshes generated by Laplacian smoothing are often withered and/or oversimplified such that they lack any discernible detail and are poor representations of the original, artist-authored meshes. In the context of video games, these issues with using Laplacian smoothing for creating proxy meshes can be noticeable to players, degrading the overall gameplay experience.

Embodiments of the disclosure provide a system and method for generating a proxy mesh for an artist-authored input polygonal mesh, as well as systems and methods for smoothing and simplifying the proxy mesh. In one implementation for generating an initial proxy mesh, a voxel volume can be created from a polygonal mesh received as input. A boundary of the voxel volume is extracted to generate a boundary mesh corresponding to the voxel volume. The boundary mesh could itself be used as a proxy mesh, but in some instances, the boundary mesh is blocky (i.e., because it is based on a voxel volume), so smoothing of the boundary mesh may provide better results.

According to the disclosed embodiments, the boundary mesh can be smoothed using quadrics transferred from the input polygonal mesh, as described in greater detail below. Quadrics are transferred from the input polygonal mesh to vertices of the boundary mesh. In some implementations, the planes of the faces incident to each edge can be packed into a mathematical construct called a quadric, consisting of a matrix, a vector, and a constant. Together, the planes effectively describe the region of space in which a moved or newly created vertex should optimally lie in order for the new, simpler patch of faces around the vertex to best approximate the shape of the original, more complex, patch of faces around the collapsed edge. In traditional mesh simplification, quadrics are commonly used to capture the shapes of the regions of the input mesh, and so inform the computation of optimal locations for single vertices that replace collapsed edges.

In one embodiment, to perform smoothing of a boundary mesh (or any second polygonal mesh that represents an input polygonal mesh), the vertices of the boundary mesh are moved to or towards their computed optimal collapse points based on the quadrics transferred from the input polygonal mesh, rather than simply to the mean of vertex neighbors. Because the transferred quadrics capture the geometry of the original input mesh, this has the effect of gradually moving vertices of the boundary mesh to nearby points on the input polygonal mesh during smoothing. In some embodiments, the aggressiveness with which vertices are moved can be controlled by a parameter that blends between the mean of neighbor vertex locations on the boundary mesh and the computed collapse points based on the transferred quadrics. The smoothing process creates a smoothed proxy mesh that, in some embodiments, can be further simplified to generate one more additional proxy meshes with smaller triangle budgets.

In some embodiments, transferred quadrics from the original input polygonal mesh are also used to perform simplification of a smoothed proxy mesh. In naive simplification, quadrics can be computed for vertices of the smoothed proxy mesh and used for simplification. In such a case, the collapse points computed for edge collapses are computed from the quadrics representing and remembering the initial geometry of the smoothed proxy mesh. In the disclosed embodiments, collapse points computed for edge collapses of the smoothed proxy mesh are computed based on quadrics transferred from the original input polygonal mesh representing the geometry that the smoothed proxy mesh approximates. This causes those vertices to "remember" the geometry of nearby areas of the original input polygonal mesh, so that new vertices created by edge collapse during simplification tend to be placed at collapse points that approximate the original input polygonal mesh, rather than the geometry of the smoothed proxy mesh that is input to simplification.

In some embodiments, quadrics can be computed for the vertices of the smoothed proxy mesh based on the geometry of the smoothed proxy mesh and blended with the quadrics transferred from the original input polygonal mesh when performing simplification. In some embodiments, when computing this blended sum of quadrics, the transferred quadrics may be weighted more significantly that the quadrics computed directly from the smoothed proxy mesh.

The disclosed embodiments thereby preserve more features and details of the original input polygonal mesh when smoothing a voxel-based proxy mesh as well as during mesh simplification.

In the disclosed embodiments, a proxy object is generated based on a known input object (e.g., an input polygonal mesh). This is a bit different and unusual for techniques involving Laplacian smoothing, since more typically the mesh being smoothed was acquired somehow (e.g., by a 3D laser scan of a real-world object), and so the mesh being smoothed is itself the only available reference for what the mesh being smoothed "should look like."

As described in greater detail herein, a system and method are disclosed for generating a proxy mesh for an artist-authored input polygonal mesh, as well as for smoothing and simplifying the proxy mesh based on quadrics of the input polygonal mesh.

Taking the context of video games as an example, the display of a video game is generally a video sequence presented to a display device capable of displaying the video sequence. The video sequence typically comprises a plurality of frames. By showing frames in succession in sequence order, simulated objects appear to move. A game engine typically generates frames in real-time response to user input, so rendering time is often constrained.

As used herein, a "frame" refers to an image of the video sequence. In some systems, such as interleaved displays, the frame might comprise multiple fields or more complex constructs, but generally a frame can be thought of as a view into a computer-generated scene at a particular time or short time window. For example, with 60 frames-per-second video, if one frame represents the scene at t=0 seconds, then the next frame would represent the scene at t=1/60 seconds. In some cases, a frame might represent the scene from t=0 seconds to t=1/60 seconds, but in the simple case, the frame is a snapshot in time.

A "scene" comprises those simulated objects that are positioned in a world coordinate space within a view pyramid, view rectangular prism, or other shaped view space. In some approaches, the scene comprises all objects (that are not obscured by other objects) within a view pyramid defined by a view point and a view rectangle with boundaries being the perspective planes through the view point and each edge of the view rectangle, possibly truncated by a background.

The simulated objects can be generated entirely from mathematical models describing the shape of the objects (such as arms and a torso described by a set of plane and/or curve surfaces), generated from stored images (such as the face of a famous person), or a combination thereof. If a game engine (or more specifically, a rendering engine that is part of the game engine or used by the game engine) has data as to where each object or portion of an object is in a scene, the frame for that scene can be rendered using standard rendering techniques.

A scene may comprise several objects or entities with some of the objects or entities being animated, in that the objects or entities may appear to move either in response to game engine rules or user input. For example, in a basketball game, a character for one of the basketball players might shoot a basket in response to user input, while a defending player will attempt to block the shooter in response to logic that is part of the game rules (e.g., an artificial intelligence component of the game rules might include a rule that defenders block shots when a shot attempt is detected) and when the ball moves through the net, the net will move in response to the ball. The net is expected to be inanimate, but the players' movements are expected to be animated and natural-appearing. Animated objects are typically referred to herein generically as characters and, in specific examples, such as animation of a football, soccer, baseball, basketball, or other sports game, the characters are typically simulated players in the game. In many cases, the characters correspond to actual sports figures and those actual sports figures might have contributed motion capture data for use in animating their corresponding character. Players and characters might be nonhuman, simulated robots, or other character types.

In some cases, an artist-authored object that is visible in a scene can be composed of may sub-objects, each of which can be quite complex and include many surfaces. For example, for an object represented as a polygonal mesh, the object may be composed of a set of polygonal meshes that form the complete object. As described herein, one technique for reducing the computational complexity of an operation involving an artist-authored object is to perform the operation using a "proxy object." A proxy object may a simpler object (e.g., a simpler polygonal mesh) made to look like the artist-authored object. The proxy object can be used as a stand-in for the artist-authored object for performing operations involving the artist-authored object to reduce computational complexity, such as, for example, when the artist-authored object is only visible from far away from a camera location. In some implementations, the full resolution artist-authored object may not be needed, and so there are circumstances in which a lower resolution, simplified object like the proxy object is more appropriate in order to reduce the resource cost.

Turning to the drawings, FIG. 1 is a block diagram of a computer system 100 for rendering images, according to aspects of the present disclosure. The computer system 100 may be, for example, used for rendering images of a video game. The computer system 100 is shown comprising a console 102 coupled to a display 104 and input/output (I/O) devices 106. Console 102 is shown comprising a processor 110, program code storage 112, temporary data storage 114, and a graphics processor 116. Console 102 may be a handheld video game device, a video game console (e.g., special purpose computing device) for operating video games, a general-purpose laptop or desktop computer, or other suitable computing system, such as a mobile phone or tablet computer. Although shown as one processor in FIG. 1, processor 110 may include one or more processors having one or more processing cores. Similarly, although shown as one processor in FIG. 1, graphics processor 116 may include one or more processors having one or more processing cores.

Program code storage 112 may be ROM (read only-memory), RAM (random access memory), DRAM (dynamic random access memory), SRAM (static random access memory), hard disk, other magnetic storage, optical storage, other storage or a combination or variation of these storage device types. In some embodiments, a portion of the program code is stored in ROM that is programmable (e.g., ROM, PROM (programmable read-only memory), EPROM (erasable programmable read-only memory), EEPROM (electrically erasable programmable read-only memory), etc.) and a portion of the program code is stored on removable media such as a disc 120 (e.g., CD-ROM, DVD-ROM, etc.), or may be stored on a cartridge, memory chip, or the like, or obtained over a network or other electronic channel as needed. In some implementations, program code can be found embodied in a non-transitory computer-readable storage medium.

Temporary data storage 114 is usable to store variables and other game and processor data. In some embodiments, temporary data storage 114 is RAM and stores data that is generated during play of a video game, and portions thereof may also be reserved for frame buffers, depth buffers, polygon lists, texture storage, and/or other data needed or usable for rendering images as part of a video game presentation.

In one embodiment, I/O devices 106 are devices a user interacts with to play a video game or otherwise interact with console 102. I/O devices 106 may include any device for interacting with console 102, including but not limited to a video game controller, joystick, keyboard, mouse, keypad, VR (virtual reality) headset or device, etc.

Display 104 can any type of display device, including a television, computer monitor, laptop screen, mobile device screen, tablet screen, etc. In some embodiments, I/O devices 106 and display 104 comprise a common device, e.g., a touchscreen device. Still further, in some embodiments, one or more of the I/O devices 106 and display 104 is integrated in the console 102.

In various embodiments, since a video game is likely to be such that the particular image sequence presented on the display 104 depends on results of game instruction processing, and those game instructions likely depend, in turn, on user inputs, the console 102 (and the processor 110 and graphics processor 116) are configured to quickly process inputs and render a responsive image sequence in real-time or near real-time.

Various other components may be included in console 102, but are omitted for clarity. An example includes a networking device configured to connect the console 102 to a network, such as the Internet.

Figure 2:
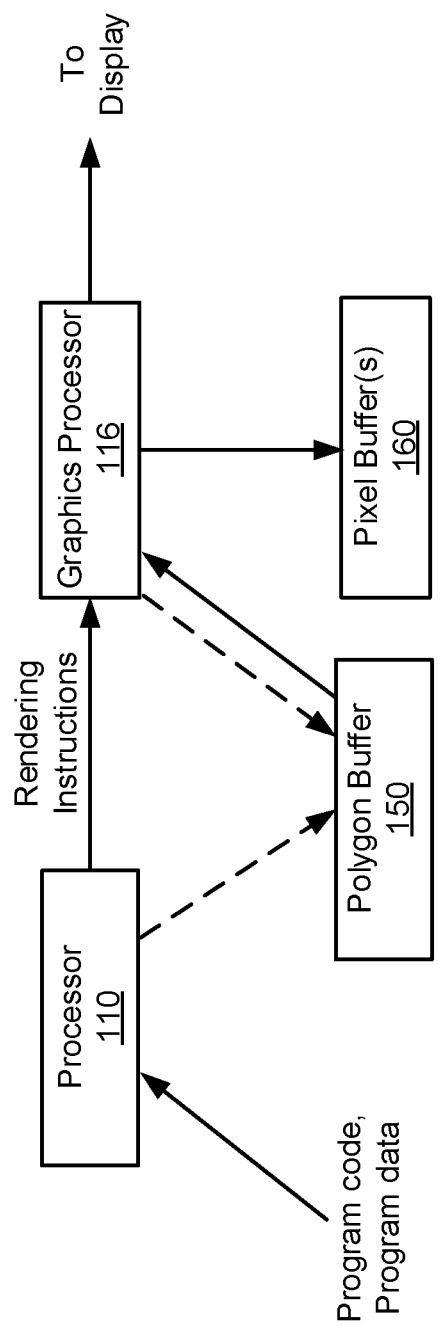
FIG. 2 is a block diagram illustrating processor and buffer interaction, according to one embodiment.

FIG. 2 is a block diagram illustrating processor and buffer interaction, according to one embodiment. As shown in FIG. 2, processor 110 executes program code and program data. In response to executing the program code, processor 110 outputs rendering instructions to graphics processor 116. Graphics processor 116, in turn, reads data from a polygon buffer 150 and interacts with pixel buffer(s) 160 to form an image sequence of one or more images that are output to a display. Alternatively, instead of sending rendering instructions to graphics processor 116 or in addition to sending rendering instructions to graphics processor 116, processor 110 may directly interact with polygon buffer 150. For example, processor 110 could determine which objects are to appear in a view and provide polygon or other mathematical representations of those objects to polygon buffer 150 for subsequent processing by graphics processor 116.

In one example implementation, processor 110 issues high-level graphics commands to graphics processor 116. In some implementations, such high-level graphics commands might be those specified by the OpenGL specification, or those specified by a graphics processor manufacturer.

In one implementation of an image rendering process, graphics processor 116 reads polygon data from polygon buffer 150 for a polygon, processes that polygon and updates pixel buffer(s) 160 accordingly, then moves on to the next polygon until all the polygons are processed, or at least all of the polygons needing to be processed and/or in view are processed. As such, a renderer processes a stream of polygons, even though the polygons may be read in place and be a finite set, where the number of polygons is known or determinable. For memory efficiency and speed, it may be preferable in some implementations that polygons be processed as a stream (as opposed to random access, or other ordering), so that fast, expensive memory used for polygons being processed is not required for all polygons comprising an image.

In some embodiments, processor 110 may load polygon buffer 150 with polygon data in a sort order (if one is possible, which might not be the case where there are overlapping polygons), but more typically polygons are stored in polygon buffer 150 in an unsorted order. It should be understood that although these examples use polygons as the image elements being processed, the apparatus and methods described herein can also be used on image elements other than polygons.

Figure 3:
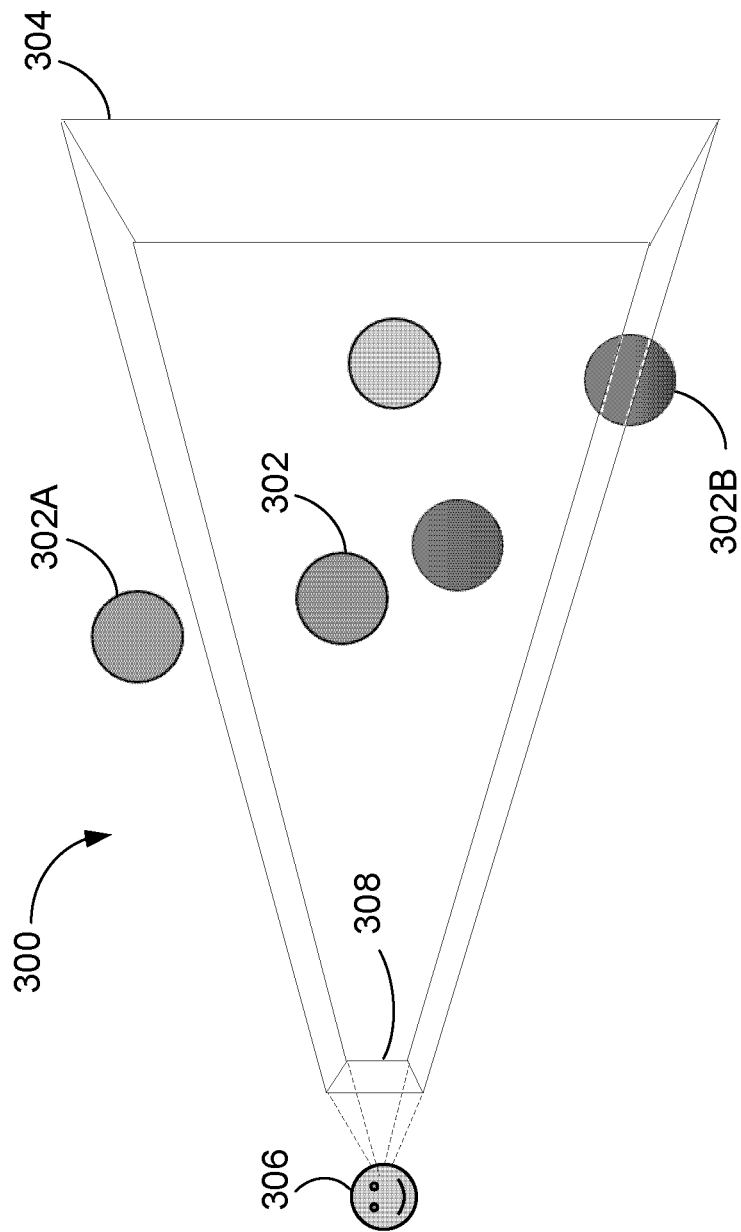
FIG. 3 is a block diagram of a scene to be rendered, according to one embodiment.

FIG. 3 is a block diagram of a scene 300 to be rendered, according to one embodiment. The scene 300 includes a plurality of 3D (three-dimensional) objects, including objects 302, 302A, 302B, for example. Each object can be comprised of a set of polygons, e.g., triangles. A camera 306 is configured to capture an image of the scene 300. A projection of the scene 300 is captured by the camera 306 and is represented by screen space 308. The view of the scene 300 captured by the camera 306 is represented by viewport 304. As shown, some of the objects, such as object 302A of the scene 300, may be outside the viewport 304. As also shown, some of the objects, such as object 302B, may be partially outside the viewport 304.

In one embodiment, the image of the scene 300 that is displayed on a display device corresponds to the screen space 308. The view of the scene 300 that the camera 306 can see (i.e., the image represented by screen space 308) can change as the camera 306 moves in 3D space relative to the objects in the scene. Also, the objects can move in the scene 300.

FIG. 4A is a block diagram illustrating rendering of a scene 400, according to one embodiment. Similar to the diagram shown in FIG. 3, scene 400 includes a plurality of objects. A camera 406 is configured to capture an image of the scene 400, represented in screen space 408. The camera 406 observes the scene 400 through viewport 410.

Various techniques can be used to render the scene 400 in screen space, including rasterization, ray tracing, or other techniques. Rasterization strives to render the pixels as those that are directly visible from the camera 406. In some implementations, rasterization can provide good performance when the renderer (e.g., processor 110 and/or graphics processor 116) does not need any global information about the scene 400.

One rasterization algorithm takes the 3D scene 400, which is described as objects comprising polygons, and renders the scene onto a 2D surface, usually a computer monitor, in screen space 408. The polygons are themselves represented as collections of triangles. Each triangle is represented by three vertices in 3D space. At a very basic level, rasterizers take a stream of vertices, transform them into corresponding 2D points in screen space 408, and fill in the transformed 2D triangles as appropriate.

Rasterization typically involves culling one or more objects or partial objects. Frustum culling removes any objects outside the viewport 410, such as object 402A. Viewport culling removes portions of objects that are partially overlapping the edge of the viewport 410, such as a portion of object 402B. Backface culling removes a back portion 404 of objects that cannot be seen by the camera 406. In some embodiments, depth testing can be performed to remove, on a per pixel basis in screen space 408, portions 406 of objects that are occluded by other objects.

When rasterization is complete, an image of scene in screen space 408 is generated. In some embodiments, pixel density of the screen space 408 can also result in information loss about the objects in the scene 400.

FIG. 4B is an example of an image of a scene, according to one embodiment. The image shown in FIG. 4B represents the image in screen space 408 of the scene 400 captured by the camera 406 in FIG. 4A.

For each pixel 412 in screen space 408, the processor has access to data corresponding to the position of the object within the pixel, the color of the object, the object's orientation, properties of the object (e.g., transparency or translucency), and/or surface roughness information, etc. The result of rasterization is, therefore, a 2D image of the 3D scene.

Although rendering has been described herein using rasterization, other embodiments may involve rendering a scene using other techniques, such as ray tracing, ray casting, radiosity, or any other rendering technique or combination thereof.

Figure 5:
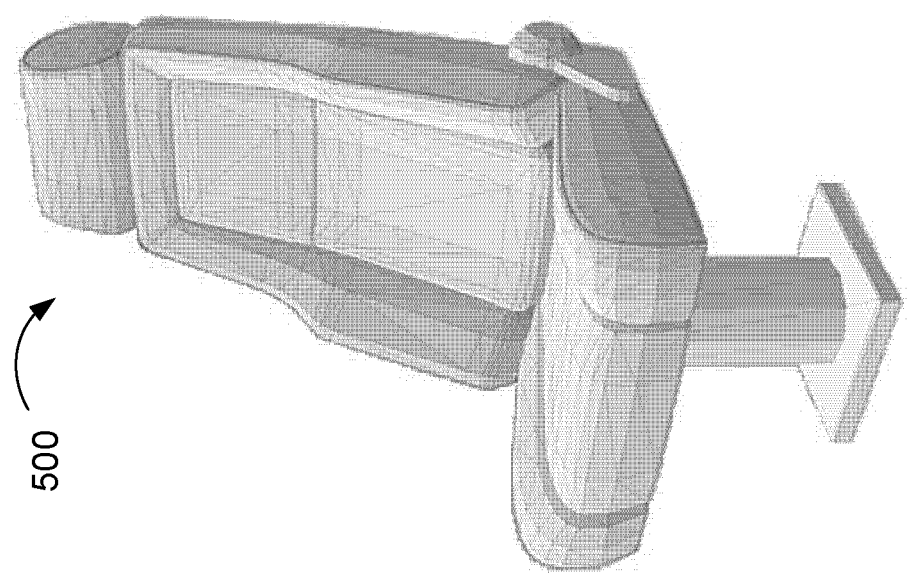
FIG. 5 is an example of a polygonal mesh, according to one embodiment.

FIG. 5 is an example of a polygonal mesh 500, according to one embodiment. As described, the polygonal mesh 500 may correspond to an artist-authored object. In the example shown, the object represents a chair. The polygonal mesh 500 comprises a collection of vertices, edges, and faces that define the shape and/or boundary of the artist-authored object. The faces may include various polygonal shapes, such as triangles, quadrilaterals, convex polygons, concave polygons, regular polygons (e.g., polygons that may have equal length sides and may have equal angles) and/or irregular polygons (e.g., polygons that may not have equal length sides and may not have equal angles).

In various embodiments, the polygonal mesh 500 may be comprised of one or more polygonal sub-meshes. Each sub-mesh may include a series of polygons. As described above, a proxy object can be generated that represents the polygonal mesh 500 to be used in operations to reduce the computational complexity of the operations.

Figure 6:
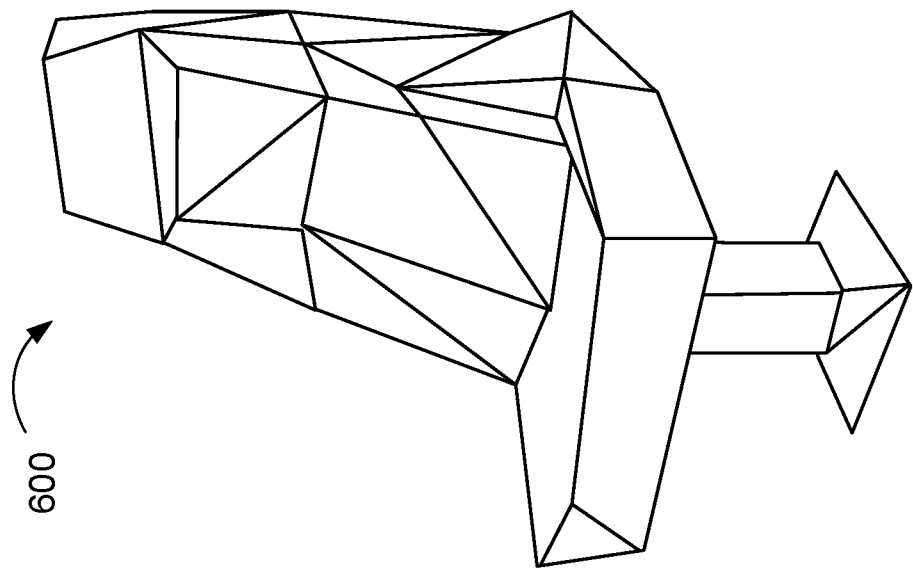
FIG. 6 is an example of a proxy mesh corresponding to the polygonal mesh in FIG. 5, according to one embodiment.

FIG. 6 is an example of a proxy mesh 600 corresponding to the polygonal mesh 500 in FIG. 5, according to one embodiment. As shown, the proxy mesh 600 is a polygonal mesh that includes a smaller number of faces, edges, and vertices compared to the polygonal mesh 500 in FIG. 5. The proxy mesh 600 can be used for graphics operations, such as rendering operations, to reduce a resource cost, where, for the case of mesh simplification, a smaller number of polygons in the mesh corresponds to a smaller resource cost. Using proxy mesh 600 for graphics operations allows the polygonal mesh corresponding to the proxy mesh 600 to be stored using less space and may allow a computing device to render the polygonal mesh more easily and may allow a computing device to use fewer computing resources (e.g., using less processing power, less memory, etc.) when rendering the polygonal mesh. As a result, the proxy mesh 600 is less expensive to store, process, render, etc. As used herein, the term "resource cost" is used to refer to the cost of computing resources in terms of storage, processing, rendering, etc.

Figure 7:
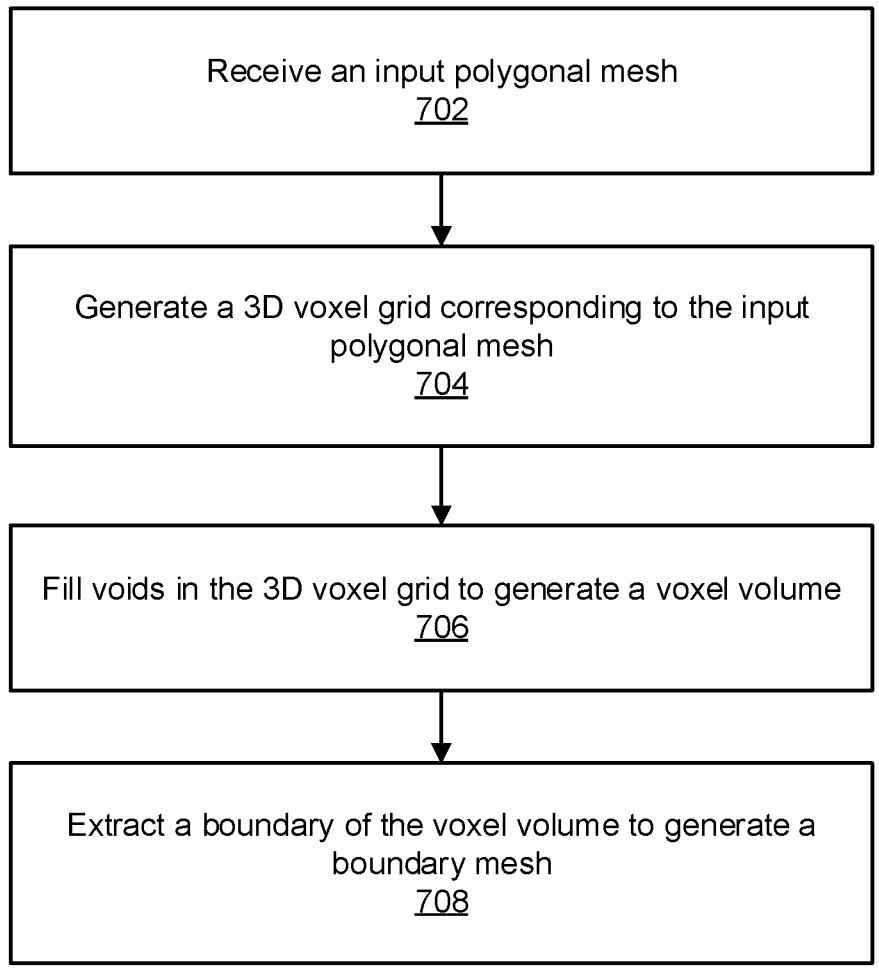
FIG. 7 is a flow diagram of method steps of generating a boundary mesh based on voxelizing an input polygonal mesh, according to one embodiment.

FIG. 7 is a flow diagram of method steps of generating a boundary mesh based on voxelizing an input polygonal mesh, according to one embodiment. In various implementations, the method can be performed by the processor 110, the graphics processor 116, or a combination of the processor 110 and the graphics processor 116.

Figure 8:
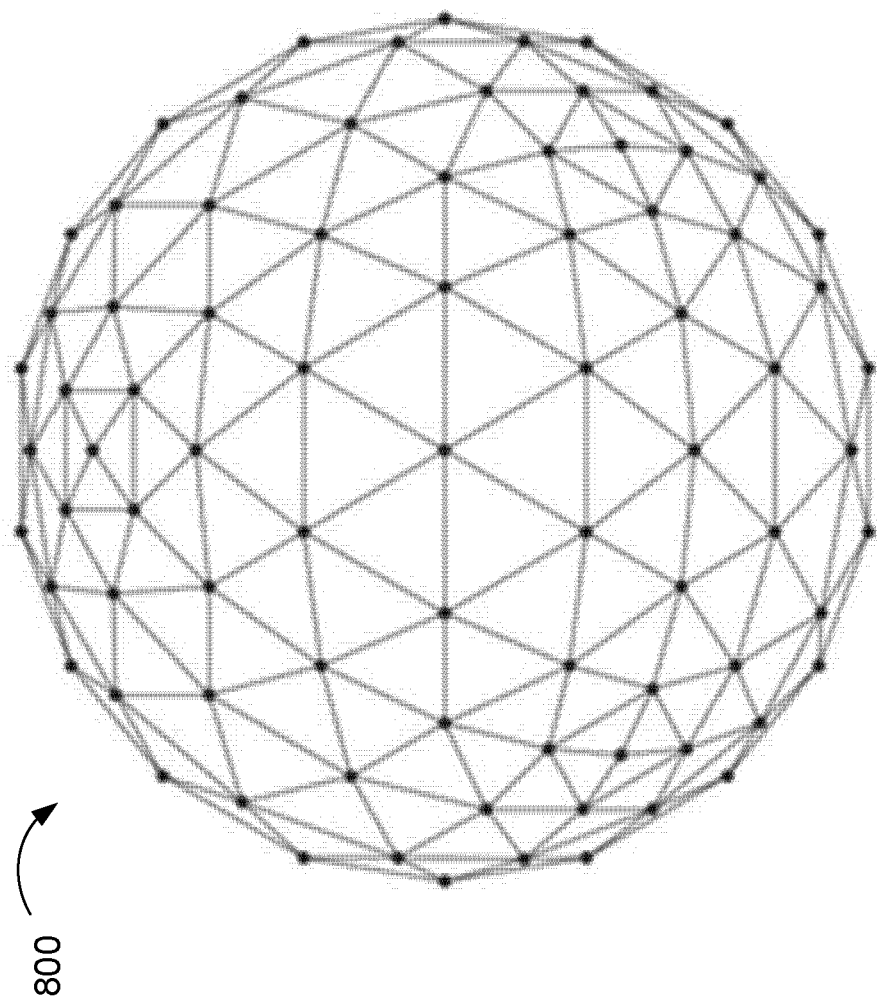
FIG. 8 is an example of an input polygonal mesh corresponding to spherical object, according to one embodiment.

As shown, the method begins at step 702, where the processor receives an input polygonal mesh. As described, the polygonal mesh may correspond to an artist-authored object. FIG. 8 is an example of an input polygonal mesh 800 corresponding to spherical object, according to one embodiment. As shown, the input polygonal mesh 800 is comprised of a series of triangles.

Figure 9:
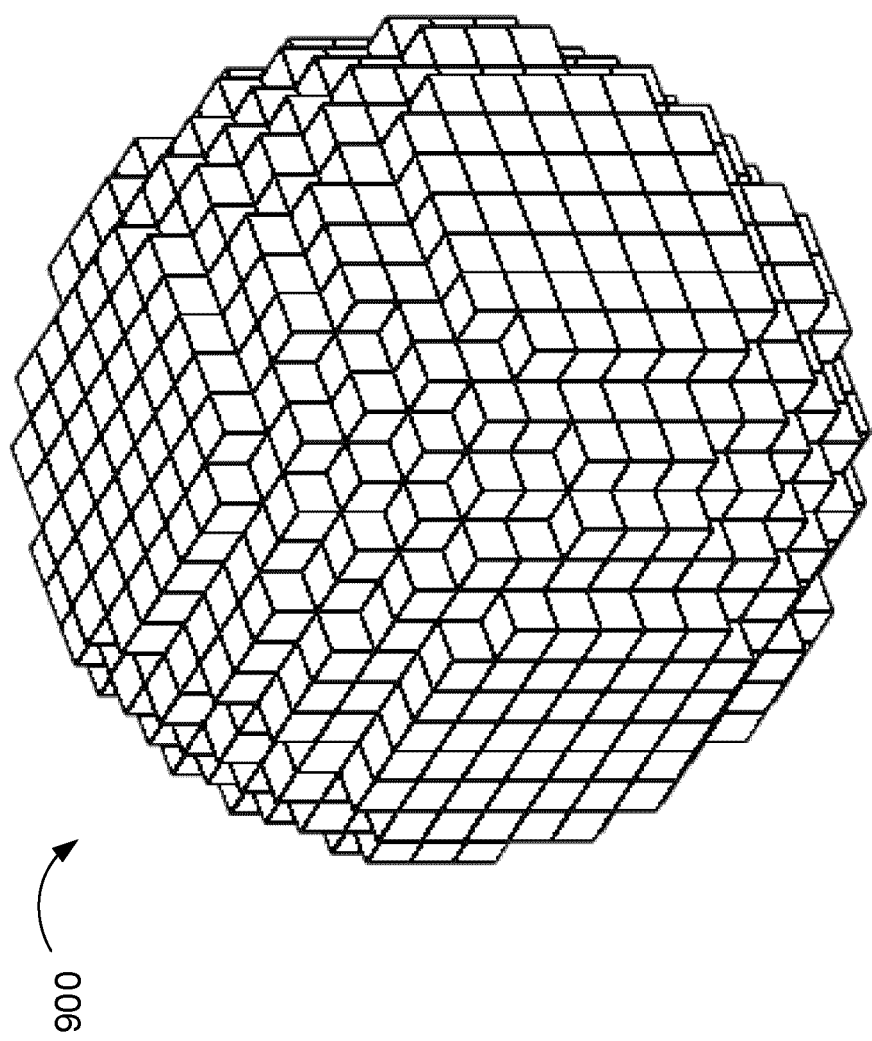
FIG. 9 is an example of a 3D voxel grid, according to one embodiment.

At step 704, the processor generates a 3D voxel grid corresponding to the input polygonal mesh. In three-dimensional (3D) computer graphics, a voxel represents a value on a regular grid in 3D space. FIG. 9 is an example of a 3D voxel grid 900, according to one embodiment. As shown in FIG. 9, the 3D voxel grid 900 is comprised of a series of voxels (e.g., cubes) that approximate the shape of the polygonal mesh 800. It is noted that, in some embodiments, the 3D voxel grid 900 is "hollow" on the inside, and merely approximates the locations of the polygons of the polygonal mesh 800, which itself can be infinitely thin and comprises a series of polygonal surfaces and is "hollow" on the inside.

In various embodiments, generating the 3D voxel grid 900 from an input polygonal mesh 800 can be done in variety of ways. In one embodiment, the 3D voxel grid 900 is fitted to the axial bounds of the input polygonal mesh 800. In this embodiment, voxels are added to the 3D voxel grid 900 at coordinates that overlap the polygons of the input polygonal mesh 800. In other embodiments, voxels are added to the 3D voxel grid 900 at coordinates that are just inside or just outside the polygons of the input polygonal mesh 800.

In various embodiments, the size and/or shape of the voxels of the 3D voxel grid 900 are customizable. In some examples, the voxels are cubes, but in other embodiments, the voxels may have a rectangular or other shape. Also, the size (i.e., resolution) of the voxels can be customizable.

It is noted also that, in some embodiments, the input polygonal mesh may not be a closed volume. For example, for an input polygonal mesh of a house object, the input polygonal mesh may comprise polygons defining four walls and a roof, but there may be no polygons that define a bottom surface (or floor) of the input polygonal mesh of the house object. There may also be other small gaps in the input polygonal mesh, if, for example, the input polygonal mesh comprises of a set of sub-meshes that do not perfectly create closed volume. In such embodiments, it is noted that the size of the voxels (i.e., the resolution of the 3D voxel grid) constrains how small of gaps can be closed by voxelization of the input polygonal mesh.

Referring back to FIG. 7, at step 706, the processor fills voids in the 3D voxel grid 900 to generate a voxel volume. As described, the 3D voxel grid 900 may be hollow. In other words, the 3D voxel grid 900 forms a "shell" of voxels that approximates the surfaces of the polygons input polygonal mesh 800. In the case of a 3D voxel grid forming an enclosed volume, filling the voids in the 3D voxel grid 900 comprises filling the voxels within the enclosed volume to generate the voxel volume.

In the case of 3D voxel grid that does not form an enclosed volume (e.g., such as a 3D voxel grid of a house object that includes four sides and a roof, but no floor, as described above), voxels are first added to enclose the volume, and then the enclosed volume is filled with voxels to generate the voxel volume. In some embodiments, filling the enclosed volume with voxels may be achieved by filling void voxels differently below a minimum voxel height, e.g., the minimum extent of the model within the voxel volume.

At step 708, the processor extracts a boundary of the voxel volume to generate a boundary mesh. The boundary mesh may be a polygonal mesh (i.e., a mesh with vertices, polygonal faces, and edges) that approximates the surface of the voxel volume.

Figure 10:
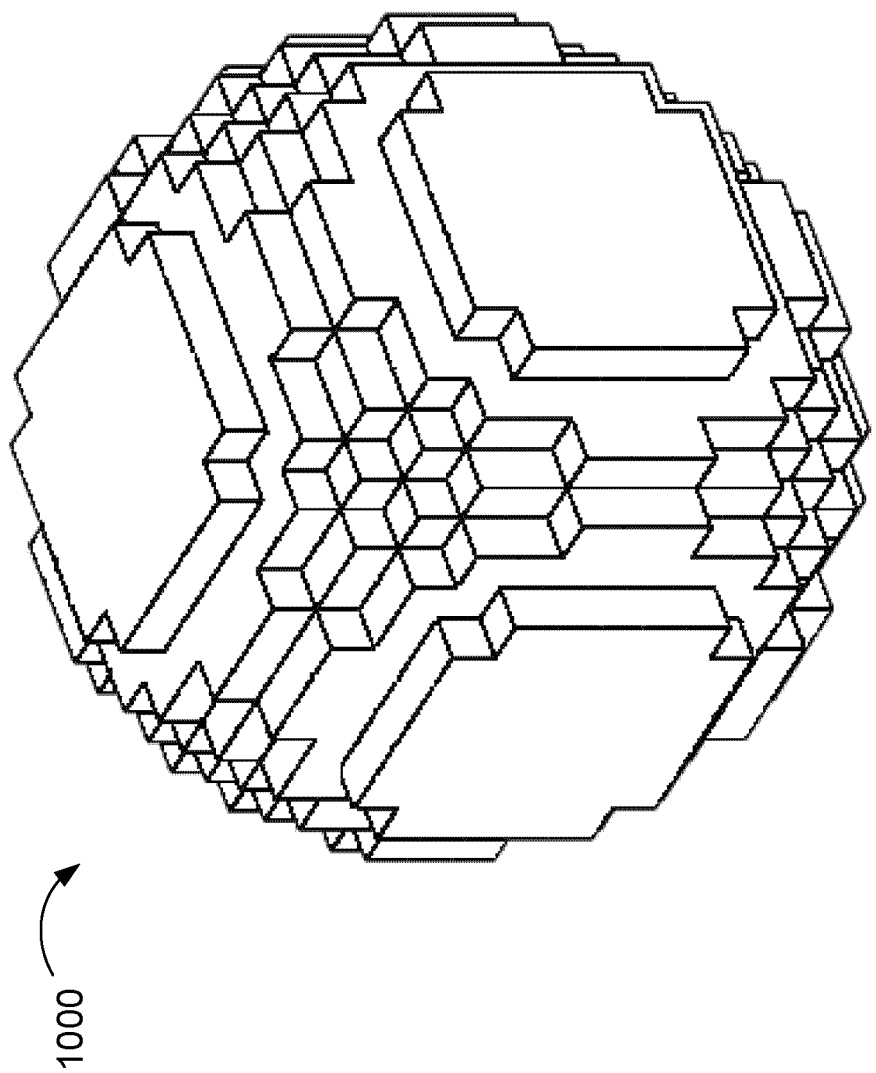
FIG. 10 is an example of a boundary mesh of a voxel volume, according to one embodiment.

FIG. 10 is an example of a boundary mesh 1000 of a voxel volume, according to one embodiment. As shown in FIG. 10, the surfaces of the boundary mesh 1000 follow the outer surface of a voxel volume (e.g., such as a voxel volume corresponding to the 3D voxel grid 900). In one embodiment, generating the boundary mesh 1000 from the voxel volume may be done by marching cubes. Marching cubes is a computer graphics algorithm for extracting a polygonal mesh from a three-dimensional discrete scalar field (such as, for example, a voxel). In some embodiments, the faces of the boundary mesh 1000 are triangulated using known algorithms such that all faces of the boundary mesh are triangles.

In some embodiments, the boundary mesh 1000 could be used as a proxy mesh for an input polygonal mesh 800, but the boundary mesh 1000 may blocky (as shown in FIG. 10) or needlessly detailed, since the boundary mesh 1000 is derived from the voxel volume. One advantage of generating the boundary mesh (e.g., to be used as a proxy mesh) using a voxelized version of the input polygonal mesh is that the resultant boundary mesh effectively remeshes the input polygonal mesh by creating a new mesh that roughly approximates the shape of the input polygonal mesh, while being freed from any topological constraints of the input polygonal mesh. Specifically, disconnected submeshes of the input polygonal mesh that are topologically separate can be merged, small holes can be filled, and any geometry present only to bound separate render materials can be removed, for example.

However, using a blocky object as a proxy mesh may produce poor results, so the boundary mesh 1000 can be smoothed. If smoothing were performed naively using conventional approaches, the results may excessively reduce the similarity of the proxy mesh to the original input polygonal mesh, since naïve smoothing techniques only use the geometry of the proxy mesh and have no a priori knowledge of the shape of the original input polygonal mesh.

Figure 11:
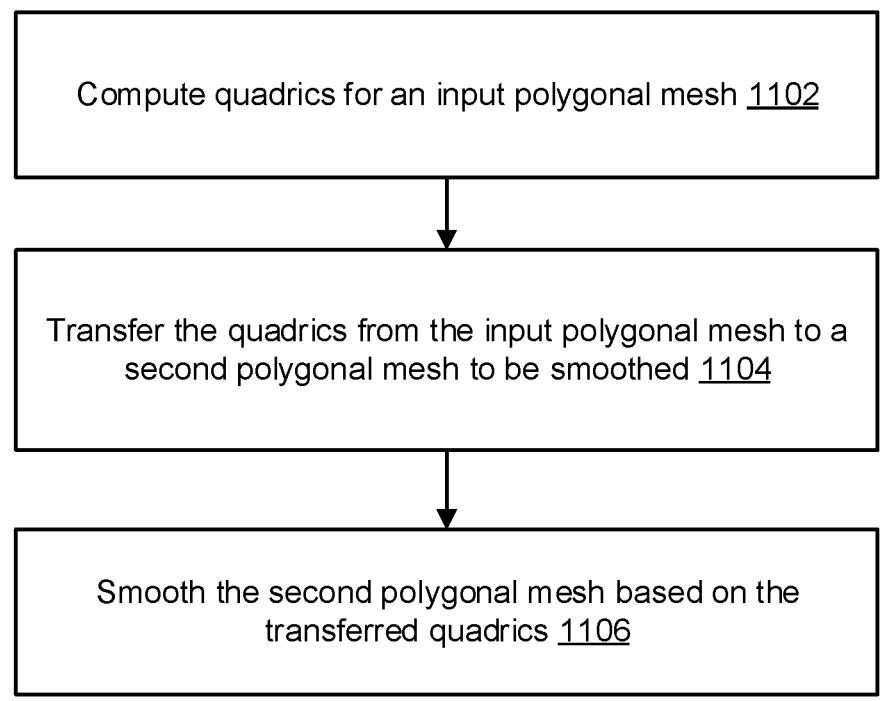
FIG. 11 is a flow diagram illustrating a technique for smoothing a polygonal mesh, according to one embodiment.

Accordingly, embodiments of the disclosure perform smoothing of a second polygonal mesh based on transferring quadrics from an input polygonal mesh on which the second polygonal mesh is based. In one embodiment, the second polygonal mesh is a boundary mesh, as shown in FIG. 10, which is based on a voxel volume. In some implementations, the smoothing process involves three phases, as shown in FIG. 11: computing quadrics for the input polygonal mesh (1102), transferring the quadrics from the input polygonal mesh to a second polygonal mesh to be smoothed (1104), and smoothing the second polygonal mesh based on the transferred quadrics (1106).

Figure 12:
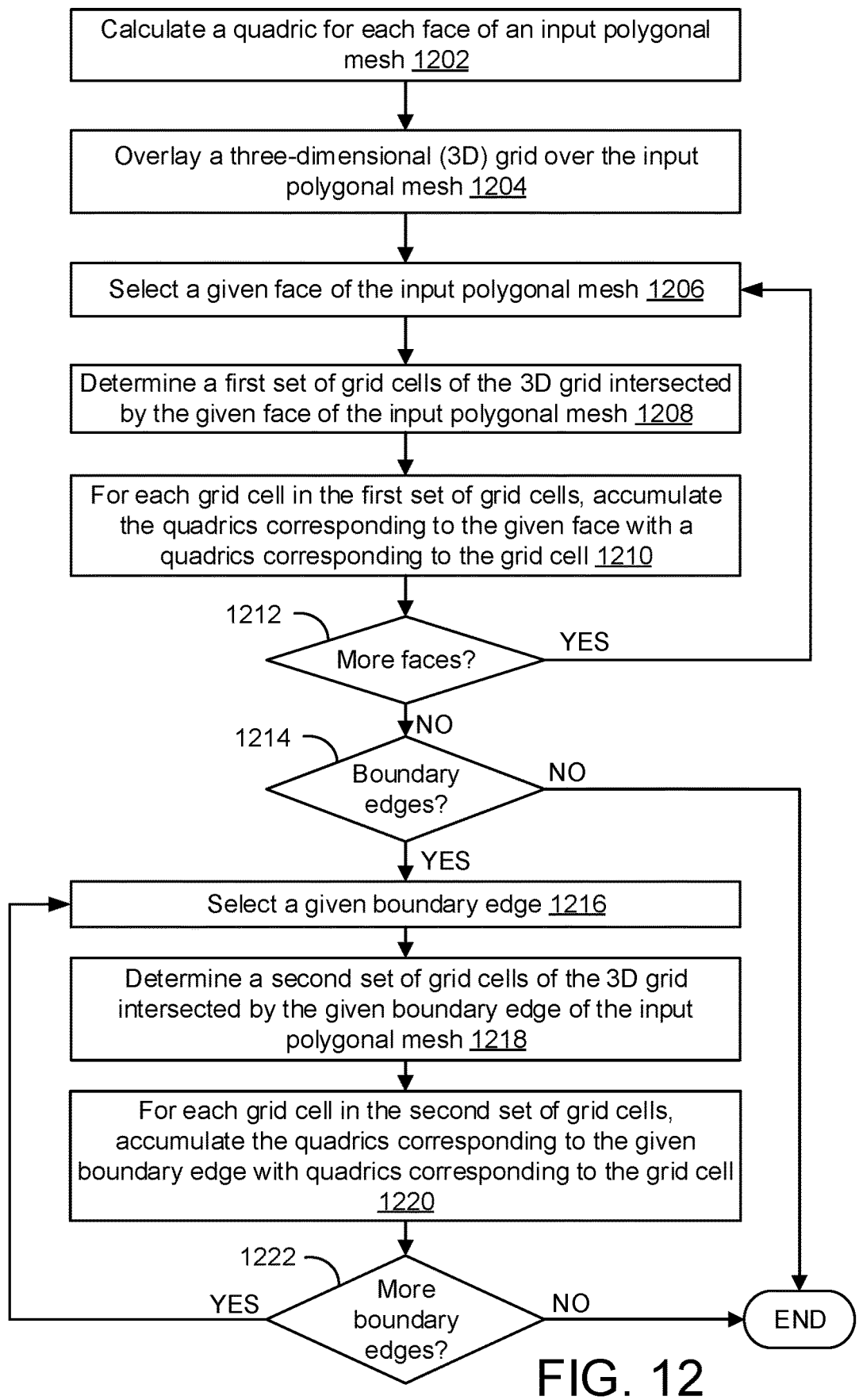
FIG. 12 is a flow diagram of method steps for computing quadrics for an input polygonal mesh, according to one embodiment.

FIG. 12 is a flow diagram of method steps for computing quadrics for an input polygonal mesh, according to one embodiment. In various implementations, the method can be performed by the processor 110, the graphics processor 116, or a combination of the processor 110 and the graphics processor 116. The steps shown in FIG. 12 are one embodiment for computing quadrics for the input polygonal mesh, i.e., phase 1102 in FIG. 11.

As shown, the method begins at step 1202, where the processor calculates a quadric for each face of an input polygonal mesh. In one implementation, to compute a quadric for a face of a polygonal mesh, first the normal vector of the face is determined. The normal can be computed by taking the cross product of two edge vectors of the face. Then, the distance of the face from the origin is calculated. As used herein, the "origin" refers to the coordinate system's zero point in 3D space. The origin is typically denoted by the point (0,0,0) in Cartesian coordinates. Calculating the distance of a face from the origin essentially measures the perpendicular distance from the origin to the plane that contains the face. This distance can be computed as the dot product of the normal vector of the face and any point on the face. Then, a quadric is computed for the face.

The quadric matrix (is a 4×4 symmetric matrix defined as follows:

$$Q = \begin{bmatrix} A & B & C & D \\ B & E & F & G \\ C & F & H & I \\ D & G & I & J \end{bmatrix}$$

where A, B, C, D, E, F, G, H, I, and J are coefficients that depend on the position and orientation of the face. These coefficients can be calculated using the following formulas:
A=normal.$x^2$
B=normal.x*normal.y
C=normal.x*normal.z
D=−normal.x*distance
E=normal.$y^2$
F=normal.y*normal.z
G=−normal.y*distance
H=normal.$z^2$
I=−normal.z*distance
J=distance$^2$ where "normal" is the normal vector of the face, and "distance" is the distance of the face from the origin. This process can be repeated for each face of the polygonal mesh to obtain a quadric matrix for each face. Once a quadric matrix is computed for each face, these matrices can be to perform various operations on the polygonal mesh, such as mesh simplification or collision detection.

The quadric of a face of a polygonal mesh represents a mathematical function that approximates the curvature of the surface within the local neighborhood of the face. It is a 4×4 symmetric matrix that encodes information about the position, orientation, and curvature of the face relative to a global coordinate system.

In one implementation, the quadric matrix Q for a face can be used to represent a quadratic function of the form:

$$f(x, y, z) = [x\ y\ z\ 1] * Q * [x\ y\ z\ 1]'$$

where [x y z 1] is a homogeneous 4D point in space. This function describes the local curvature of the surface around the face and can be used to perform operations such as surface fitting, mesh smoothing, or collision detection.

In some implementations, computing a quadric for a vertex of a polygonal mesh includes the following steps:
1. For each face that is adjacent to the vertex, calculate the quadric matrix for that face using the process discussed above for computing a quadric for a face.
2. Add up all the quadric matrices computed in step 1 to obtain a total quadric matrix for the vertex. You can do this by summing the coefficients of each matrix element.
3. If the vertex is on the boundary of the mesh (i.e., it is not adjacent to three or more faces), you can simply use the quadric matrix of the one or two faces that are adjacent to the vertex.
4. Once you have computed the quadric matrix for each vertex, you can use these matrices to perform various operations on the mesh, such as mesh simplification, collision detection, or surface fitting.

One common application of vertex quadrics is mesh simplification, where the goal is to reduce the number of vertices in a mesh while preserving its overall shape. In this context, the quadric matrix for each vertex can be used to measure the error introduced by removing that vertex, and the vertex with the smallest error can be selected for removal at each step. This process can be repeated iteratively until the desired level of simplification is achieved.

In one implementation of using quadrics for edge collapse operations, a quadric (or quadric error metric) is a per-vertex property of vertices of a polygonal mesh that provides a measurement of error that determines how far a vertex is from an ideal spot during edge collapse. The cost (error) is small or zero in cases where an edge is a non-feature or can safely be removed without impacting the shape of the mesh. The cost (error) is positive and potentially large in cases where the edge is a feature edge and its removal would cause geometric distortion. Edges that are available for collapse can be stored on a priority queue and in each step, the edge with lowest cost is picked and collapsed. The queue is then updated to reflect the edges no longer available and any new edges that are newly available.

In some embodiments, quadrics are stored and associated with each vertex of the input polygonal mesh. Initially, the quadrics associated with each vertex reflect just the planes of the faces incident to that vertex in the input polygonal mesh. When an edge is collapsed, the quadrics of the two vertices of the edge are summed, and the resultant summed quadric is associated with the new vertex that replaces the collapsed edge. Because quadrics effectively remember a set of planes (weighted by areas), summing two quadrics effectively merges the two sets of planes, forming a combined representation of all of them. That means that as edges are collapsed to vertices, the quadrics computed at the new vertices effectively "remember" the geometry of the original input polygonal mesh at the vertices of all edges collapsed in that area of the mesh up to that point. As a result, the collapse points computed for subsequent edges take into account not just the faces currently incident to the edge, but also all the faces incident to edges already collapsed previously to form the two vertices of the edge. This helps to ensure that the simplification continually strives to represent the shape of the original mesh, so the simplified mesh approximates that shape as closely as possible.

One implementation of a mesh simplification algorithm is based on the iterative contraction of vertex pairs, which can be written as $(v_i, v_j) \to \bar{v}$. The order of edge collapse depends on the error that quantifies the distance of point to the faces.

Let v be a vertex in three-dimensional space which is $[v_x, v_y, v_z, 1]^T$. And p represents a plane in three-dimensional space, whose equation is:

$$ax + by + cz + d = 0, \quad (1)$$

with $a^2+b^2+c^2=1$, and we can denote $p=[a, b, c, d]^T$.

The distance from vertex v to the plane p is $$D^2 = (p^T v)^2 = (p^T v)^T \cdot (p^T v) = v^T(pp^T)v = v^T K_p v, \quad (2)$$

where $K_p$ represents a 4×4 matrix as defined in the following formula:

$$K_p = pp^T = \begin{vmatrix} a^2 & ab & ac & ad \\ ab & b^2 & bc & bd \\ ac & bc & c^2 & cd \\ ad & bd & cd & d^2 \end{vmatrix}. \quad (3)$$

A set of planes is associated with each vertex. The error of each vertex is defined as the sum of squared distances to all planes. This vertex belongs to $$\Delta(v) = \sum_{p \in planes(v)} D^2(v) = \sum_{p \in planes(v)} v^T(K_p)v = v^T \left( \sum_{p \in planes(v)} K_p \right) v \quad (4)$$

where planes(v) represents all the triangles that meet at that vertex.

When an edge is collapsed, the resulting quadric error is $\Delta(\bar{v}) = \Delta(v_i) + \Delta(v_j)$, where $\Delta(\bar{v})$ is the error for new vertex $\bar{v}$. Selecting the location for the new vertex is crucial for maintaining the original mesh topology. The position of new vertex $\bar{v}$ is determined for each pair contraction. Since the error function $\Delta(v)$ is quadratic as shown in Equation (4), we can find $\bar{v}$ by solving a quadratic equation:

$$\frac{\partial \Delta(v)}{\partial x} = \frac{\partial \Delta(v)}{\partial y} = \frac{\partial \Delta(v)}{\partial z} = 0 \quad (5)$$

This is equivalent to solving the following equation:

$$A\bar{v} = \begin{vmatrix} q_{11} & q_{12} & q_{13} & q_{13} \\ q_{21} & q_{22} & q_{23} & q_{24} \\ q_{31} & q_{32} & q_{33} & q_{34} \\ 0 & 0 & 0 & 1 \end{vmatrix} \begin{vmatrix} v_x \\ v_y \\ v_z \\ 1 \end{vmatrix} = \begin{vmatrix} 0 \\ 0 \\ 0 \\ 1 \end{vmatrix} \quad (6)$$

On one hand, if matrix A is invertible, the optimal position of $\bar{v}$ is $A^{-1}b$. On the other hand, if matrix A is not invertible, we can approximately set $\bar{v}$ to $v_i$, $v_j$, or $(v_i, v_j)/2$.

Referring back to FIG. 12, at step 1204, the processor overlays a three-dimensional (3D) grid over the input polygonal mesh. In one embodiment, the 3D grid may have the same extents and resolutions and be on the same axes as the 3D grid used for voxelization of the input polygonal mesh, as described in step 704 of FIG. 7.

At step 1206, the processor selects a given face of the input polygonal mesh. At step 1208, the processor determines a first set of grid cells of the 3D grid intersected by the given face of the input polygonal mesh. In one implementation, a triangle-grid cell intersection test is performed to identify the first set of grid cells of the 3D grid intersected by the given face.

Figure 13B:
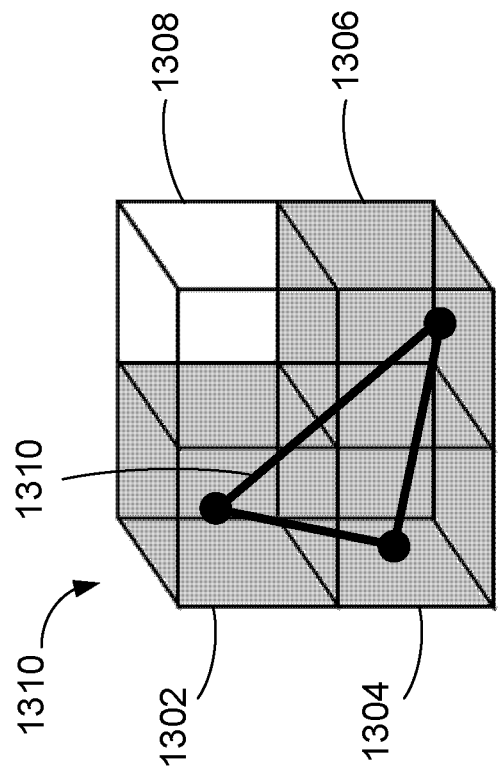
FIG. 13B shows a portion of a 3D grid overlaid over the input polygonal mesh, according to one embodiment.
Figure 13A:
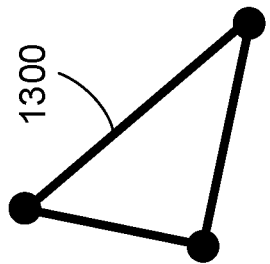
FIG. 13A is an example of a face of an input polygonal mesh, according to one embodiment.

FIG. 13A is an example of a face 1300 of an input polygonal mesh, according to one embodiment. FIG. 13B shows a portion of a 3D grid 1310 overlaid over the input polygonal mesh, according to one embodiment. Four grid cells 1302, 1304, 1306, 1308 (in two dimensions) of the 3D grid 1310 are shown in FIG. 13B for clarity, although persons having ordinary skill in the art would understand that the 3D grid 1310 would include many more grid cells and grid cells in three dimensions. As shown in FIG. 13B, face 1300 intersects grid cells 1302, 1304, 1306, but does not interest grid cell 1308.

Referring back to FIG. 12, at step 1210, for each grid cell in the first set of grid cells intersected by the given face, the processor accumulates the quadrics corresponding to the given face with a quadric corresponding to the grid cell. Initially, the quadrics for each grid cell of the 3D grid are zero. The first time a face is identified as intersecting a grid cell, the quadrics corresponding to the given face are assigned as the quadrics corresponding to the grid cell. The second and subsequent time a face is identified as intersecting a grid cell (i.e., another face also intersects the same grid cell), the quadrics corresponding to the given face are accumulated with the existing quadrics corresponding to the grid cell by summing the quadrics corresponding to the given face with the existing quadrics corresponding to the grid cell.

At step 1212, the processor determines whether there are any more faces to process. If no, the method proceeds to step 1214. If yes, the method returns to step 1206, where another face is selected for processing.

After the quadrics for each face have been accumulated in the grid cells of the 3D grid, at step 1214, the processor determines whether there are any boundary edges included in input polygonal mesh. A boundary edge, as used herein, is an edge with only one face incident to the edge.

At step 1216, the processor selects a given boundary edge. At step 1218, the processor determines a second set of grid cells of the 3D grid intersected by the given boundary edge of the input polygonal mesh. In one implementation, a line-grid cell intersection test is performed to identify the second set of grid cells of the 3D grid intersected by the given boundary edge.

At step 1220, for each grid cell in the second set of grid cells, the processor accumulates the quadrics corresponding to the given boundary edge with quadrics corresponding to the grid cell. In one implementation, the quadrics for a given boundary edge are calculated to 'pin' the boundary to computed planes perpendicular to those of the incident faces, so tend to prevent boundaries from moving around during simplification. Accumulating the quadrics for the given boundary edge with the quadrics corresponding to the grid cell may be similar to step 1210 for accumulating quadrics of faces in the 3D grid.

At step 1212, the processor determines whether there are any more boundary edges to process. If yes, the method returns to step 1216. If no, the method terminates.

As such, the result of the process in FIG. 12 is a 3D grid of grid cells where each grid cell is associated with quadrics corresponding to the faces and boundary edges of the input polygonal mesh that intersect the grid cell. In some embodiments, steps 1214-1222 related to processing boundary edges may be optional (for example, if the polygonal mesh does not include any boundary edges), and each grid cell of the 3D grid is associated with quadrics corresponding to the faces of the input polygonal mesh that intersect the grid cell.

After the preprocessing phase of computing quadrics for the input polygonal mesh is complete, the next phase is to transfer quadrics to a second polygonal mesh to be smoothed. In one implementation, the second polygonal mesh may be a proxy mesh, such as a boundary mesh based on a voxel volume, as discussed above.

Figure 14:
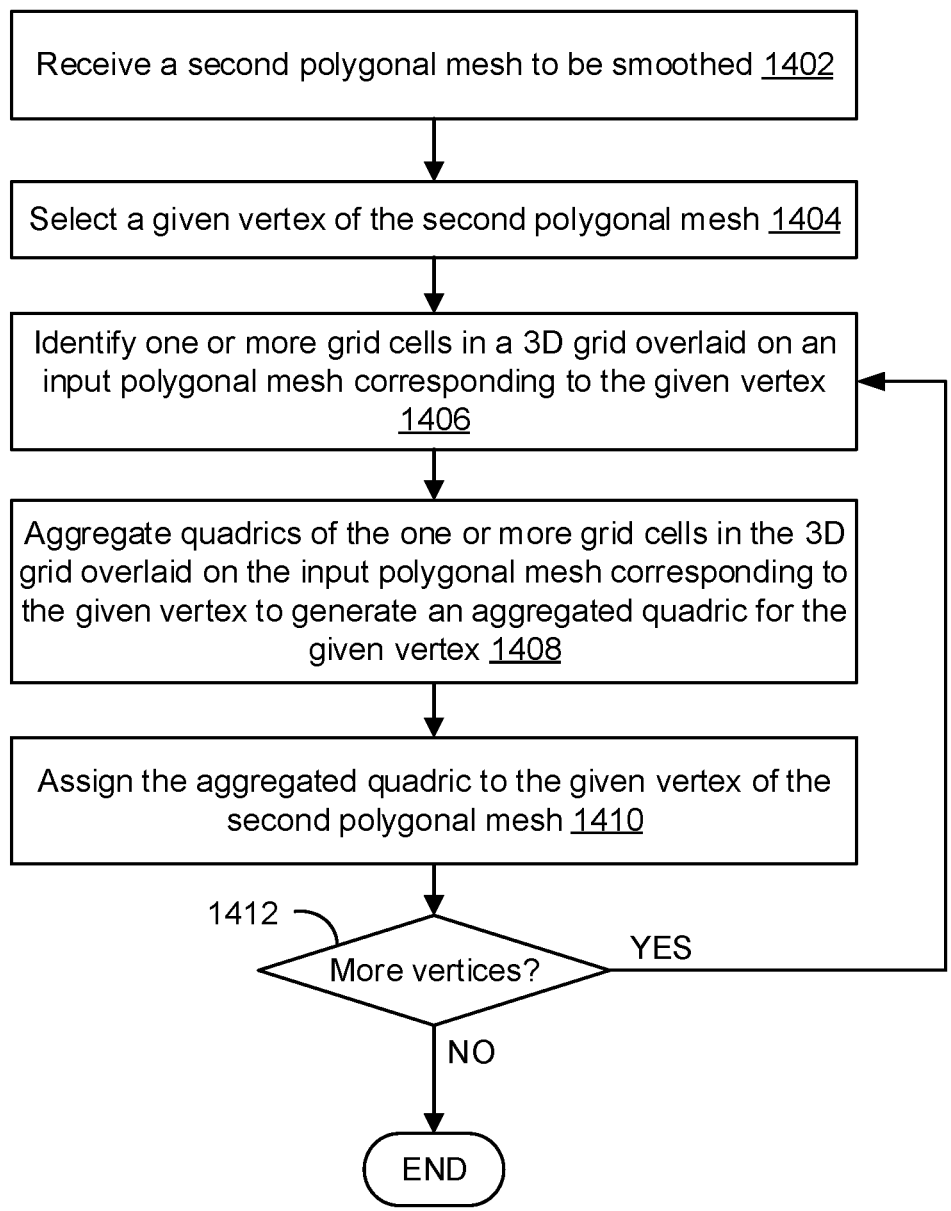
FIG. 14 is a flow diagram of method steps for transferring quadrics for an input polygonal mesh to a second polygonal mesh to be smoothed, according to one embodiment.

FIG. 14 is a flow diagram of method steps for transferring quadrics for an input polygonal mesh to a second polygonal mesh to be smoothed, according to one embodiment. In various implementations, the method can be performed by the processor 110, the graphics processor 116, or a combination of the processor 110 and the graphics processor 116. The voxel-based boundary mesh may be a "proxy" mesh to be used as a stand-in for the input polygonal mesh. The steps shown in FIG. 14 are one embodiment for transferring quadrics, i.e., phase 1104 in FIG. 11.

As shown, the method begins at step 1402, where the processor receives a second polygonal mesh to be smoothed. In one embodiment, the second polygonal mesh is a proxy mesh that represents an input polygonal mesh. In one implementation, a three-dimensional (3D) voxel volume can be generated based on the input polygonal mesh, and a corresponding boundary mesh of the voxel volume can be used as the second polygonal mesh to be smoothed. In one implementation, the voxel volume may be the voxel volume generated at step 706 in FIG. 7.

At step 1404, the processor selects a given vertex of the second polygonal mesh. At step 1406, the processor identifies one or more grid cells in a 3D grid overlaid on an input polygonal mesh corresponding to the given vertex of the second polygonal mesh.

As described, a 3D grid was overlaid on the input polygonal mesh (i.e., step 1204 in FIG. 12) and quadrics were accumulated for each grid cell of the 3D grid from the faces (and optionally boundary edges) of the input polygonal mesh. In one implementation, a simple mapping of the vertex location in the second polygonal mesh into the 3D can be performed.

In another implementation, such as where the voxel-based boundary mesh used as the second polygonal mesh was created using the same resolution as the 3D grid overlaid on the input polygonal mesh, the vertices of the boundary mesh would fall at the intersection points of the grid cells of the 3D grid. In such a case, the technique shown in FIG. 15 may be used to map a vertex of the boundary mesh to one or more grid cells of the 3D grid.

Figure 15:
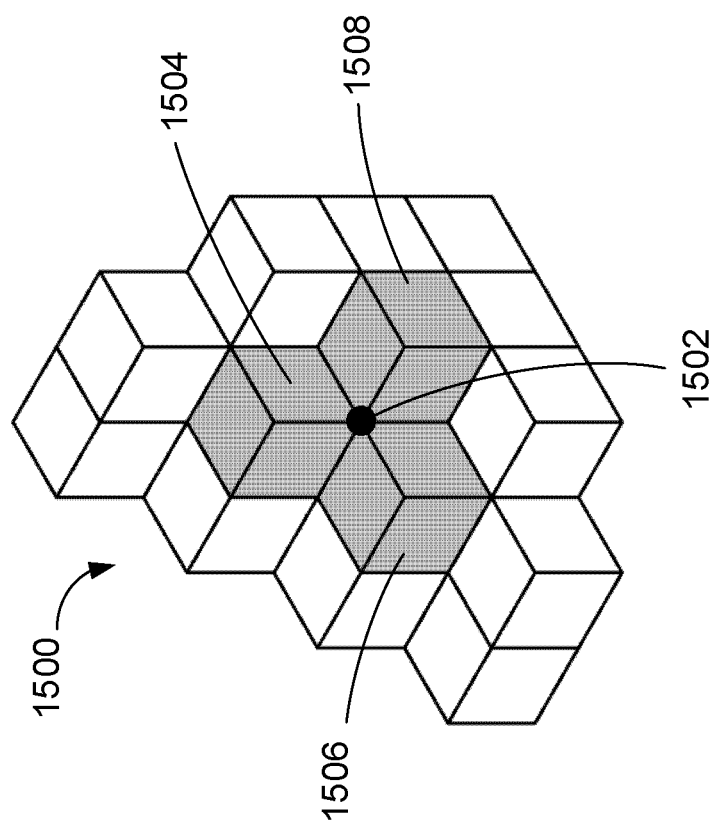
FIG. 15 is an example of a portion of a voxel volume corresponding to the boundary mesh, according to one embodiment.

FIG. 15 is an example of a portion of a voxel volume 1500 corresponding to the boundary mesh, according to one embodiment. For vertex 1502, a set of faces incident on the vertex 1502 is identified. Then, the set of voxels in the voxel volume corresponding to the set of faces incident on the vertex is identified. In FIG. 15, voxels 1504, 1506, 1508 are identified as the voxels incident on vertex 1502. The voxels 1504, 1506, 1508 have corresponding locations in the 3D grid that was overlaid on the input polygonal mesh. The locations of the identified voxels being incident on the vertex may therefore be selected as the one or more grid cells in a 3D grid overlaid on an input polygonal mesh corresponding to the given vertex from which quadrics are transferred.

Referring back to FIG. 14, at step 1408, the processor aggregates quadrics of the one or more grid cells in the 3D grid overlaid on the input polygonal mesh corresponding to the given vertex to generate an aggregated quadric for the given vertex. If the given vertex corresponds to a single grid cell, then aggregating the quadrics involves simply selecting the quadrics of the grid cell. In a case where the given vertex corresponds to two or more grid cells (such as where the second polygonal mesh is a boundary mesh based on a voxel volume, referring to the example in FIG. 15), the quadrics of the two or more grid cells that correspond to given vertex (e.g., grid cells corresponding to voxels 1504, 1506, 1508 in FIG. 15) may be aggregated (e.g., summed) to generate an aggregated quadric for the given vertex (e.g., vertex 1502).

At step 1410, the processor assigns the aggregated quadric to the given vertex of the second polygonal mesh.

At step 1412, the processor determines whether there are any more vertices to process. If yes, the method returns to step 1404. If no, the method terminates. After the process of FIG. 14 is complete, each vertex of the second polygonal mesh to be smoothed is associated with quadrics transferred from the input polygonal mesh. The second polygonal mesh can now be smoothed using said transferred quadrics.

In another embodiment, instead of using the method of FIG. 14 to transfer quadrics from the input polygonal mesh to the second polygonal mesh, functional maps can be used to transfer quadrics. Functional maps can be used to determine, for any point on one mesh, the corresponding point on another mesh. Once the quadrics are identified for the vertices of the input polygonal mesh, a functional map can be used to identify corresponding vertices in the second polygonal mesh and transfer the quadrics from the input polygonal mesh to the second polygonal mesh.

Figure 16:
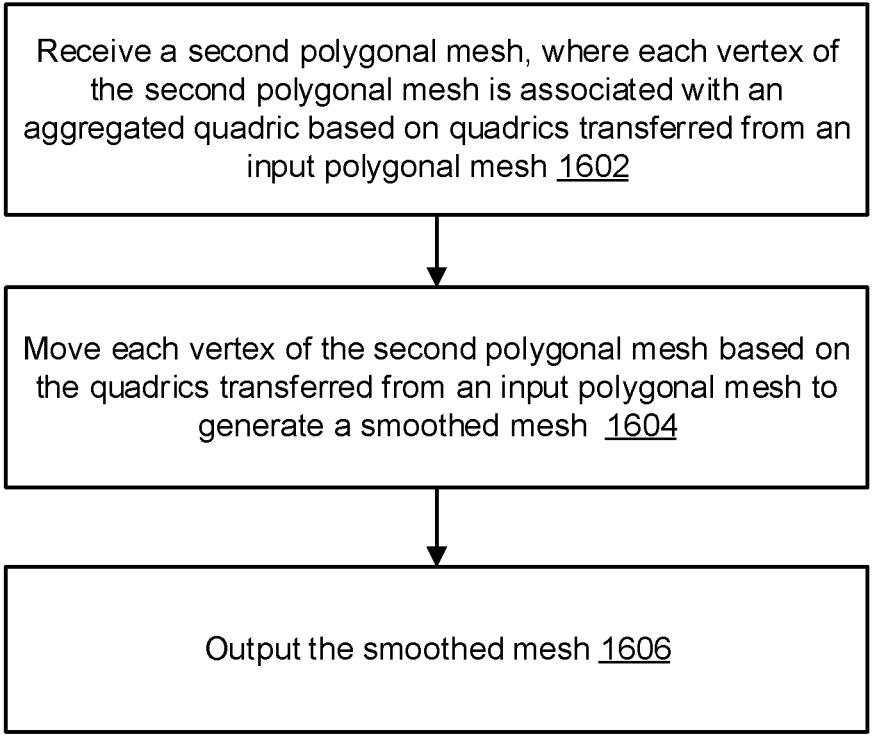
FIG. 16 is a flow diagram of method steps for smoothing a second polygonal mesh associated with transferred quadrics, according to one embodiment.

FIG. 16 is a flow diagram of method steps for smoothing a second polygonal mesh associated with transferred quadrics, according to one embodiment. In various implementations, the method can be performed by the processor 110, the graphics processor 116, or a combination of the processor 110 and the graphics processor 116. The steps shown in FIG. 16 are one embodiment for smoothing the boundary mesh, i.e., phase 1106 in FIG. 11.

As shown, the method begins at step 1602, where the processor receives a second polygonal mesh, where each vertex of the second polygonal mesh is associated with an aggregated quadric based on quadrics transferred from an input polygonal mesh.

At step 1604, the processor moves each vertex of the second polygonal mesh based on the aggregated quadric to generate a smoothed mesh. A new location of each vertex is based on its associated aggregated quadric. The new location of each vertex is computed as an optimal point of where the vertex should be located on the input polygonal mesh based on the aggregated quadric. At step 1606, the processor outputs the smoothed mesh.

As such, in FIG. 16, each vertex is moved to (or toward) its computed optimal location, rather than simply to the mean of its neighbors (i.e., Laplacian smoothing). This has the effect of gradually moving vertices towards points on the original input polygonal mesh during smoothing, since the movement of vertices is based on quadrics transferred from the original input polygonal mesh. Also, in some embodiments, the aggressiveness with which vertices are moved can be controlled by a parameter that blends between the mean of the neighbors (Laplacian smoothing) and the computed optimal location based on transferred quadrics.

In some embodiments, a new material is baked for the smoothed mesh with a simple UV map that mimics the appearance of the (often multiple) materials of the original input polygonal mesh by, for example, applying colors from corresponding locations of the input polygonal mesh and the smoothed mesh to generate a texture map for the smoothed mesh.

Although the smoothed mesh is now "smooth" (i.e., not blocky), the smoothed mesh may still be too complex for use as a proxy object. Thus, the smoothed mesh may be simplified using mesh simplification, such as by using traditional edge collapse simplification, or any other mesh simplification technique could be used. In some implementations, the smoothed mesh is further simplified based on the transferred quadrics from the original input polygonal mesh.

Figure 17:
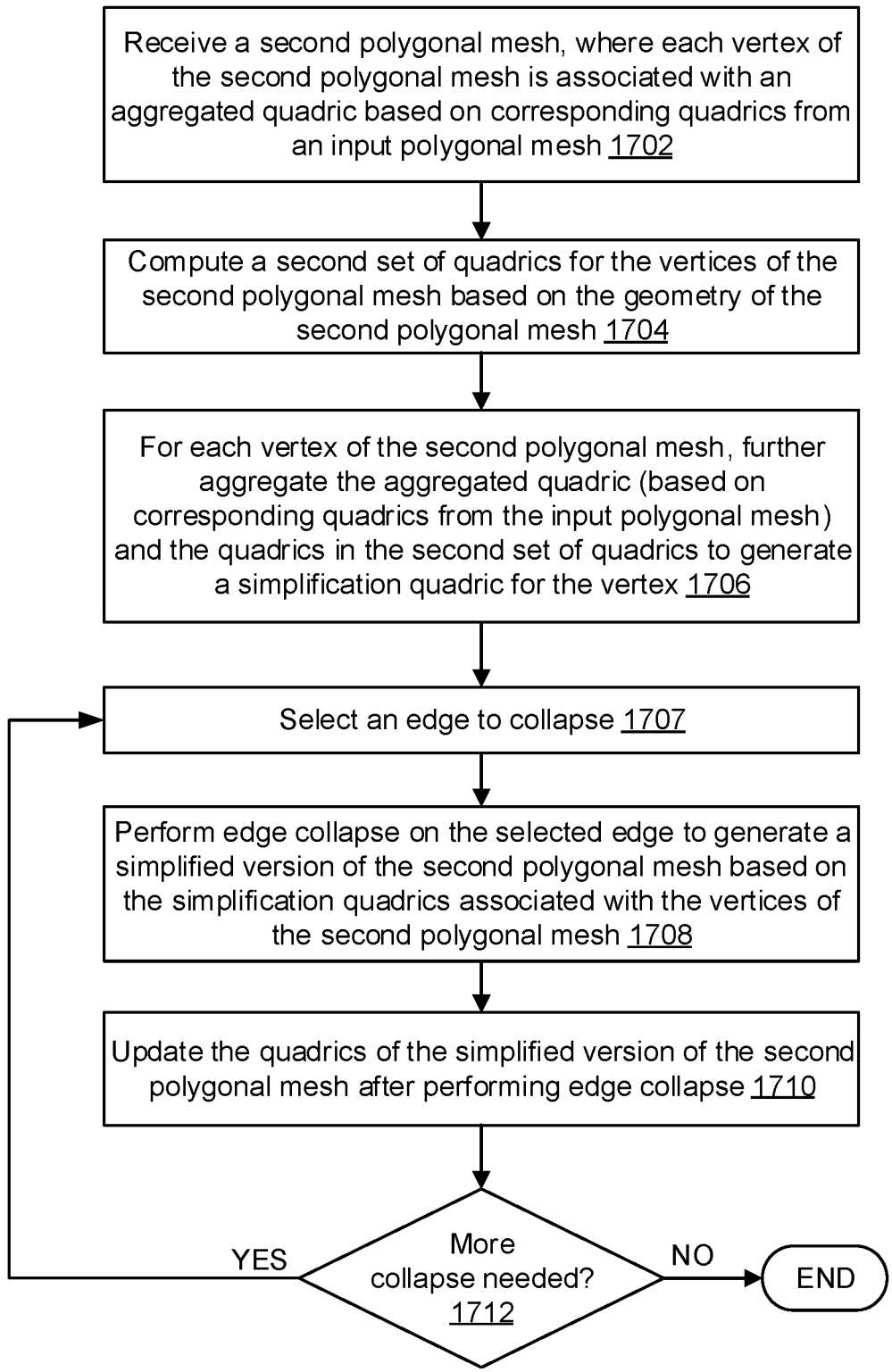
FIG. 17 is a flow diagram of method steps for simplifying a second polygonal mesh based on transferred quadrics, according to one embodiment.

FIG. 17 is a flow diagram of method steps for simplifying a second polygonal mesh based on transferred quadrics, according to one embodiment. In various implementations, the method can be performed by the processor 110, the graphics processor 116, or a combination of the processor 110 and the graphics processor 116.

As shown, the method begins at step 1702, where the processor receives a second polygonal mesh, where each vertex of the second polygonal mesh is associated with an aggregated quadric based on corresponding quadrics from an input polygonal mesh. In one embodiment, the second polygonal mesh may be a smoothed mesh generated using the method of FIG. 16. In other embodiments, any proxy mesh for the input polygonal mesh can be used as the second polygonal mesh.

At step 1704, the processor computes a second set of quadrics for the vertices of the second polygonal mesh based on the geometry of the second polygonal mesh. This step is similar to traditional quadric computation for a given polygonal mesh, where the quadrics are based on the geometry of the given polygonal mesh.

At step 1706, for each vertex of the second polygonal mesh, the processor further aggregates the aggregated quadric (based on corresponding quadrics transferred from the input polygonal mesh) and the quadrics in the second set of quadrics to generate a simplification quadric for the vertex.

At step 1707, the processor selects an edge to collapse (i.e., in the second polygonal mesh). As described above, the edge that is selected may be the edge whose removal would result in a new vertex with minimal quadric error.

At step 1708, the processor performs edge collapse on the selected edge to generate a simplified version of the second polygonal mesh based on the simplification quadrics associated with the vertices of the second polygonal mesh. In one implementation, an edge is collapsed to a new vertex location. As described above in reference to Equations (1) to (6) edges can be iteratively collapsed by minimizing the quadric error metric of the collapsed edges. At step 1710, the processor updates the quadrics of the simplified version of the second polygonal mesh after performing edge collapse. After an edge is collapsed to generate a new vertex location, the quadric of the new vertex location is updated to be a sum of the quadrics of the vertices of the now-collapsed edge.

At step 1712, the processor determines whether more edges should be collapsed. If yes, the method returns to step 1707. If no, the method terminates. The mesh simplification process of FIG. 17 can be repeated until a desired triangle budget is reached, at which point a simplified version of the second polygonal mesh at the desired triangle budget has been achieved. One or more simplified versions of the second polygonal meshes (i.e., additional proxy meshes) can be generated using the process of FIG. 17 at different triangle budgets.

In sum, embodiments of the disclosure provide a technique for generating proxy meshes based on transferred quadrics from the original input polygonal mesh. In the smoothing stage, the use of quadrics transferred from the input mesh informs the smoothing of the optimal locations of smoothed vertices. In the simplification stage, the same transferred quadrics, still on the smoothed mesh, inform edge collapse of the optimal locations of collapsed vertices for different proxy meshes at different triangle budgets. The disclosed embodiments therefore preserve more features and detail of the original input polygonal mesh in the proxy meshes, which provides better visual results.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A method for generating a proxy mesh, the method comprising:
    receiving, by one or more processors, a reference mesh, wherein the reference mesh comprises a polygonal mesh that is a computer representation of a three-dimensional (3D) object;
    computing, by the one or more processors, quadrics corresponding to the reference mesh;
    receiving, by the one or more processors, a second polygonal mesh, wherein the second polygonal mesh comprises a polygonal mesh generated based on the reference mesh;
    transferring, by the one or more processors, the quadrics corresponding to the reference mesh to the second polygonal mesh; and
    generating, by the one or more processors, a proxy mesh based on the quadrics corresponding to the reference mesh transferred to the second polygonal mesh.

2. The method according to claim 1, wherein computing the quadrics corresponding to the reference mesh comprises:
    calculating a quadric for each face of the reference mesh;
    overlaying a three-dimensional (3D) grid over the reference mesh;
    for each grid cell of the 3D grid, determining a set of faces of the reference mesh that intersect the grid cell; and
    for each grid cell of the 3D grid, accumulating the quadrics of the faces in the set of faces of the reference mesh that intersect the grid cell.

3. The method according to claim 1, wherein the second polygonal mesh is a boundary mesh generated based on a 3D voxel volume corresponding to the reference mesh.

4. The method according to claim 3, wherein transferring the quadrics corresponding to the reference mesh to the second polygonal mesh comprises:
    receiving a 3D voxel volume corresponding to the boundary mesh;
    for each vertex of the boundary mesh, identifying a set of voxels of the 3D voxel volume incident on the vertex; and
    for each vertex of the boundary mesh, aggregating quadrics from a set of grid cells in the 3D grid overlaid on the reference mesh that correspond to the voxels in the set of voxels of the 3D voxel volume incident on the vertex.

5. The method according to claim 1, wherein generating the proxy mesh comprises:
    moving one or more vertices of the second polygonal mesh to new locations based on the quadrics corresponding to the reference mesh transferred to the second polygonal mesh for the one or more vertices to generate the proxy mesh.

6. The method according to claim 1, wherein generating the proxy mesh comprises:
    collapsing one or more edges of the second polygonal mesh based on the quadrics corresponding to the reference mesh transferred to the second polygonal mesh to generate the proxy mesh.

7. The method according to claim 6, further comprising:
    computing a second set of quadrics for the vertices of the second polygonal mesh based on geometry of the second polygonal mesh;
    for each vertex of the second polygonal mesh, aggregating the quadrics transferred from the reference mesh and the quadrics in the second set of quadrics corresponding to the vertex to generate a simplification quadric for the vertex; and
    collapsing one or more edges of the second polygonal mesh based on the simplification quadrics associated with the vertices of the second polygonal mesh.

8. A non-transitory computer-readable storage medium storing instructions that, when executed by one or more processors, causes a computing device to generate a proxy mesh, by performing the steps of:
    receiving a reference mesh, wherein the reference mesh comprises a polygonal mesh that is a computer representation of a three-dimensional (3D) object;
    computing quadrics corresponding to the reference mesh;
    receiving a second polygonal mesh, wherein the second polygonal mesh comprises a polygonal mesh generated based on the reference mesh;
    transferring the quadrics corresponding to the reference mesh to the second polygonal mesh; and
    generating a proxy mesh based on the quadrics corresponding to the reference mesh transferred to the second polygonal mesh.

9. The computer-readable storage medium according to claim 8, wherein computing the quadrics corresponding to the reference mesh comprises:
    calculating a quadric for each face of the reference mesh;
    overlaying a three-dimensional (3D) grid over the reference mesh;
    for each grid cell of the 3D grid, determining a set of faces of the reference mesh that intersect the grid cell; and
    for each grid cell of the 3D grid, accumulating the quadrics of the faces in the set of faces of the reference mesh that intersect the grid cell.

10. The computer-readable storage medium according to claim 8, wherein the second polygonal mesh is a boundary mesh generated based on a 3D voxel volume corresponding to the reference mesh.

11. The computer-readable storage medium according to claim 10, wherein transferring the quadrics corresponding to the reference mesh to the second polygonal mesh comprises:
    receiving a 3D voxel volume corresponding to the boundary mesh;
    for each vertex of the boundary mesh, identifying a set of voxels of the 3D voxel volume incident on the vertex; and for each vertex of the boundary mesh, aggregating quadrics from a set of grid cells in the 3D grid overlaid on the reference mesh that correspond to the voxels in the set of voxels of the 3D voxel volume incident on the vertex.

12. The computer-readable storage medium according to claim 8, wherein generating the proxy mesh comprises:

moving one or more vertices of the second polygonal mesh to new locations based on the quadrics corresponding to the reference mesh transferred to the second polygonal mesh for the one or more vertices to generate the proxy mesh.

13. The computer-readable storage medium according to claim 8, wherein generating the proxy mesh comprises:

collapsing one or more edges of the second polygonal mesh based on the quadrics corresponding to the reference mesh transferred to the second polygonal mesh to generate the proxy mesh.

14. The computer-readable storage medium according to claim 13, the steps further comprising:

computing a second set of quadrics for the vertices of the second polygonal mesh based on geometry of the second polygonal mesh;

for each vertex of the second polygonal mesh, aggregating the quadrics transferred from the reference mesh and the quadrics in the second set of quadrics corresponding to the vertex to generate a simplification quadric for the vertex; and collapsing one or more edges of the second polygonal mesh based on the simplification quadrics associated with the vertices of the second polygonal mesh.

15. A device for generating a proxy mesh, the device comprising:

a memory storing instructions; and one or more processors configured to the execute the instructions to cause the device to:

receive a reference mesh, wherein the reference mesh comprises a polygonal mesh that is a computer representation of a three-dimensional (3D) object;

compute quadrics corresponding to the reference mesh;

receive a second polygonal mesh, wherein the second polygonal mesh comprises a polygonal mesh generated based on the reference mesh;

transfer the quadrics corresponding to the reference mesh to the second polygonal mesh; and generate a proxy mesh based on the quadrics corresponding to the reference mesh transferred to the second polygonal mesh.

16. The device according to claim 15, wherein computing the quadrics corresponding to the reference mesh comprises:

calculating a quadric for each face of the reference mesh;

overlaying a three-dimensional (3D) grid over the reference mesh;

for each grid cell of the 3D grid, determining a set of faces of the reference mesh that intersect the grid cell; and for each grid cell of the 3D grid, accumulating the quadrics of the faces in the set of faces of the reference mesh that intersect the grid cell.

17. The device according to claim 15, wherein the second polygonal mesh is a boundary mesh generated based on a 3D voxel volume corresponding to the reference mesh, and wherein transferring the quadrics corresponding to the reference mesh to the second polygonal mesh comprises:

receiving a 3D voxel volume corresponding to the boundary mesh;

for each vertex of the boundary mesh, identifying a set of voxels of the 3D voxel volume incident on the vertex; and for each vertex of the boundary mesh, aggregating quadrics from a set of grid cells in the 3D grid overlaid on the reference mesh that correspond to the voxels in the set of voxels of the 3D voxel volume incident on the vertex.

18. The device according to claim 15, wherein the one or more processors executing the instructions further causes the device to:

moving one or more vertices of the second polygonal mesh to new locations based on the quadrics corresponding to the reference mesh transferred to the second polygonal mesh for the one or more vertices to generate the proxy mesh.

19. The device according to claim 15, wherein generating the proxy mesh comprises:

collapsing one or more edges of the second polygonal mesh based on the quadrics corresponding to the reference mesh transferred to the second polygonal mesh to generate the proxy mesh.

20. The device according to claim 19, wherein the one or more processors executing the instructions further causes the device to:

compute a second set of quadrics for the vertices of the second polygonal mesh based on geometry of the second polygonal mesh;

for each vertex of the second polygonal mesh, aggregate the quadrics transferred from the reference mesh and the quadrics in the second set of quadrics corresponding to the vertex to generate a simplification quadric for the vertex; and collapse one or more edges of the second polygonal mesh based on the simplification quadrics associated with the vertices of the second polygonal mesh.

* * * * *